United States Patent [19]

Kroyer

[11] 4,254,019
[45] Mar. 3, 1981

[54] MINERAL-RESIN MATRIX

[76] Inventor: Karl K. K. Krøyer, Engtoften 3,, DK-8260 Viby J., Denmark

[21] Appl. No.: 798,980

[22] Filed: May 20, 1977

[30] Foreign Application Priority Data

May 24, 1976 [GB] United Kingdom ............... 21367/76
Jul. 21, 1976 [GB] United Kingdom ............... 30413/76

[51] Int. Cl.³ ............................................. C08L 61/06
[52] U.S. Cl. .................................... 260/38; 260/37 N; 260/37 EP; 260/39 R
[58] Field of Search ............. 428/407; 260/38, 37 EP, 260/39 R, 37 N; 427/407; 106/52

[56] References Cited

U.S. PATENT DOCUMENTS

| 2,182,384 | 12/1939 | McGregor | 106/52 |
|---|---|---|---|
| 3,078,249 | 2/1963 | Russell | 260/40 R |
| 3,627,713 | 12/1971 | Maruta et al. | 428/407 |
| 3,755,240 | 8/1973 | Lucker et al. | 260/38 |
| 3,988,289 | 10/1976 | Clock et al. | 260/38 |
| 4,020,306 | 4/1977 | Fahner | 200/293 |
| 4,022,749 | 5/1977 | Kuechler | 260/38 |
| 4,026,864 | 5/1977 | Diethelm et al. | 260/38 |
| 4,036,798 | 7/1977 | Hoppe et al. | 260/38 |

FOREIGN PATENT DOCUMENTS

| 955090 | 4/1964 | United Kingdom . |
|---|---|---|
| 1041768 | 9/1966 | United Kingdom . |
| 1112616 | 5/1968 | United Kingdom . |
| 1194935 | 6/1970 | United Kingdom . |
| 1252601 | 11/1971 | United Kingdom . |
| 1348381 | 3/1974 | United Kingdom . |
| 1360529 | 7/1974 | United Kingdom . |
| 1372608 | 10/1974 | United Kingdom . |
| 1442287 | 7/1976 | United Kingdom . |
| 1464243 | 2/1977 | United Kingdom . |

*Primary Examiner*—Lewis T. Jacobs
*Attorney, Agent, or Firm*—Ladas & Parry

[57] ABSTRACT

A molding material is disclosed comprising crystallizable glass or cement clinkers ground to particles comprising fractions of relatively fine-grained material and fractions of coarser particles, the coarser particles being bound to each other by a matrix comprising an intimate mixture of an organic binder and the particles of the relatively fine-grained material.

8 Claims, No Drawings

MINERAL-RESIN MATRIX

This invention relates to a mineral-resin matrix useful as a moulding composition or as a putty or binder for combining coarser mineral particles to produce articles or semi-manufactures having excellent mechanical properties, such as high strength.

It is the object of the present invention to produce a mineral-resin matrix having a high mineral to resin ratio.

It is another object of the invention to provide a moulding composition in which the matrix is combined with coarse mineral particles to form very strong articles having an extremely high content of mineral particles and very low content of organic resins.

It is yet another object of the invention to produce products or articles having excellent mechanical properties at considerably reduced prices.

The matrix of the invention consists mainly of mineral particles coated with a minor amount of a resin. The mineral particles preferably used are crystallized glass, possibly in combination with other particles having rough surfaces such as sand, ground cement clinkers, ground glass, ground tiles and bricks, and similar materials, possibly in admixture with particles of less hard minerals such as limestone, talc, gypsum, pumice, dry clay, china clay and the like.

A preferred mineral is crystallized glass made in a rotary kiln and ground to a suitable particle size, for example by using a ball mill. A product of this kind is known as "synopal particles".

Such synopal particles contain numerous tiny bubbles, and the surfaces of the ground particles are rough and have numerous cavities resulting from cleavage through the bubbles. Due to this surface structure the ground particles adhere well to organic resins and to each other in interlocking relationship.

The particle size of the mineral can be varied to suit the use. For most purposes a particle size of from 0 to 150 $\mu$m has proved advantageous. Other particle sizes can be used, such as up to 250 $\mu$m. Particles having an ideal fineness characteristic are preferred.

It has also been found that in the matrix the synopal particles can be replaced, wholly or in part, by cement clinkers which have been subjected to further heat treatment for the purpose of strengthening the crystalline and ceramic structure, and minimizing the hydraulic effect.

This further heat treatment can be provided preferably by renewed heating to at least 1000° C., particularly in a rotary kiln, after cooling the clinkers to room temperature. The cement clinkers may, for example be gradually heated to about 1050° C. over a period of about two hours, after which the temperature is gradually lowered to about 500° C., followed by cooling the product to room temperature.

Alternatively, the heating period employed in the ordinary production of cement clinkers may be extended by 30 minutes, for example, and/or the heating zone may be moved to a higher position in the kiln.

In these methods it is likewise possible to obtain wholly or partly crystallized and/or ceramized cement clinkers, although these have a somewhat coarser crystal size and with that less strength than that attainable by cooling and re-heating.

A test of the cement clinker material before and after the aforesaid re-heating showed a crystallized product with relatively small crystals, and that the clinkers, which after the treatment owing to the crystallization are no longer clinkers in the ordinary sense of this word, had obtained considerably improved crushing strength.

Normally, the strength of an aggregate is determined by the following standard test:

A grain size fraction of 5–7 mm is clean-separated for 5 min. on a 5-mm screen, after which 500 g are weighed out and filled into a test cylinder. The sample is subjected to a plunger provided with a 4-kg weight, whereupon there are applied 20 strokes with a 14-kg drop hammer at a 25-cm elevation.

The sample is now separated on 5-4-3-2-1 mm screens for 5 min., and the crushing number is calculated as indicated in the following example:

| | | | |
|---|---|---|---|
| +5 | 408 g | 81.6% | |
| +4 | 31 - | 6.2 = e | 18.4 (a + b + c + d + e) |
| +3 | 17 - | 3.4 = d | 12.2 (a + b + c + d) |
| +2 | 11 - | 2.2 = c | 8.8 (a + b + c) |
| +1 | 11 - | 2.2 = b | 6.6 (a + b) |
| −1 | 22 - | 4.4 = a | 4.4 (a) |
| | 500 g | 100.0% | 50.4 |

Crushing number: 50

Test of cement clinkers:

| Without heating | | | from room temperature after heating to 1050° C. | | | |
|---|---|---|---|---|---|---|
| 5 | 275 | 55.0 | | 5 | 372 | 74.4 |
| 4 | 64 | 12.8 | 45.0% | 4 | 39 | 7.8 | 25.6% |
| 3 | 66 | 13.2 | 32.2 - | 3 | 37 | 7.4 | 17.8 - |
| 2 | 29 | 5.8 | 19.0 - | 2 | 15 | 3.0 | 10.4 - |
| 1 | 25 | 5.0 | 13.2 - | 1 | 13 | 2.6 | 7.4 - |
| −1 | 41 | 8.2 | 8.2 - | −1 | 24 | 4.8 | 4.8 - |
| | 500 g | 117.6% | | | 500 g | | 66.0% |

Crushing number: 118     Crushing number: 66

The heat treatment thus resulted in almost halving the crushing number. It will be noted that the crushing strength increases with decreasing values of crushing number.

As the resin component any organic resin can be used. Examples of suitable resins are thermosetting resins or cold curing resins, such as epoxy resins, melamine resins, urea formaldehyderesins, unsaturated polyesters, urethane resins and phenol formaldehyde resins, or thermoplastic resins, such as polyethylene, polypropylene, polyvinyl chloride, polyvinyl acetate, polyacrylates, polystyrene, polyamides and polycarbonates.

The ratio between mineral particles and the resin component can be varied within wide limits. The proportion of resin should be kept as small as possible without reducing the desired mechanical properties. An amount of 5–20% resin, e.g. 10% resin, is suitable for most purposes. More resin can be used, for example 20–30% resin or 30–50% resin, if desired. Also, smaller amounts of resin can be used, for example 2–5% resin. Normally, this will reduce the mechanical strength and other properties of the final product.

The mixing of the mineral particles and the resin component is carried out in such a way that the resin, usually in powder form, is ground into the interstices and the surface irregularities of the mineral particles. Suitable mixing equipments for this purpose are ball mills and mixers having a similar grinding effect. The mixing process may sometimes be facilitated by adding a solvent, or the resin may be introduced as a solution of the organic resin in a suitable solvent or as a suspension or emulsion in water. As the solvent can be used any conventional solvent for resins. Normally, the solvent evaporates during the mixing procedure.

If desired, it is possible to add also minor amounts of various additives or adjuvants to achieve desired effects or as fillers. Hence, silicon oxides or silicates may be added, f. inst. Aerosil, which in amounts of from 0.01 to 1% will result in increased fluidity, improved density and uniformity of the finished product.

Other additives suitable in small or moderate amounts are small glass spheres, short mineral fibres, for example of glass or rockwool, and pigments. Also, the products may be reinforced by metal threads or grating, glass fibre mats or woven cloth, cellulose fibres, paper or the like. Pigmentation will produce various decorative effects. By mixing fractions of different colors it is also possible to obtain various marbled patterns.

The mineral-resin matrix of the invention can be used per se as a molding composition for molding various articles in conventional manner, for example by compression moulding. The matrix is, however, especially suitable as a putty or binder for combining coarse mineral particles to produce firm and strong agglomerates, useful for various articles or semi-manufactures. The agglomerate is typically composed of coarse particles of crystallized glass having interior bubbles and open surface bubbles or cavities penetrating the surface of the coarse particles. The coarse particles are glued together with the matrix of the invention, consisting of fine crystallized glass particles embedded in resin. The matrix also fills the open surface bubbles or cavities, providing anchoring between the coarse particles.

The amount and particle size of the coarse mineral particles to be mixed with the matrix of the invention depend on the end use of the articles and the technology available for the forming process. For most purposes particle sizes from 250 to 1000 μm is suitable. Even coarser particles can be used, however, for example 1-5 mm, especially when articles of large dimensions are to be produced. The ratio of coarse particles to matrix depends on the type of particles, the use and the desired properties of the product and may vary within wide limits. For example, 1 to 5 parts by weight of coarse particle to 1 part by weight of matrix is generally suitable.

The mixture is finally compressed or formed in any other desired manner to produce strong articles having extremely low resin content, based on the total mix. As the organic resin is by far the most expensive component of the mixture, very cheap products having satisfactory or excellent characteristics can be obtained.

The mineral-resin matrix of the invention can be formulated to obtain a large variety of properties of the end products. Thus, the formulation can be modified in order to obtain products having high mechanical strength, increased weather resistance, high porosity or non-porosity, and different colour effects.

The invention will be further explained below by way of examples.

EXAMPLE 1

This example describes a matrix which has proved particularly suitable for wall tiles in a kitchen, a bathroom or the like. For this purpose it is of major importance that the surface is heat-resistant and non-porous. It can also withstand water, acid, alkalies, molten fats and to a certain extent organic solvents. The matrix itself is used as molding material, and no large particles are introduced.

The following ingredients are mixed:

| | | |
|---|---|---|
| | Phenolic Resin | 12-16% |
| | Synopal 0-140 μm | 80-85% |
| | Metal Oxides | 0-4% |
| or | | |
| | Epoxy Resin | 15-20% |
| | Sand 300 μm | 20-25% |
| | Synopal 0-140 μm | 55% |
| | Metal Oxides | 5% |

EXAMPLE 2

This matrix contains larger particles, and it is also used for tiles. It is possible to produce ordinary wall tiles to be used for decoration only, e.g. above a dining table standing against a wall. They can be used in the same way as ceramic tiles but they are much cheaper and easier to mount on the wall, too. No qualified craftsmen are needed. The demands of technical quality, however, are not so severe as in the case of tiles according to Example 1 and thus it would be a luxury to mold them in pure matrix.

| | | |
|---|---|---|
| | Phenolic Resin | 3-7% |
| | Synopal 0-140 μm | 35-40% |
| | Synopal 200-600 μm | 50-58% |
| | Metal Oxides | 0-4% |
| or | | |
| | Epoxy Resin | 5-10% |
| | Nylon | 5-10% |
| | Synopal 0-140 μm | 25-30% |
| | Synopal 200-600 μm | 45-50% |
| | Metal Oxides | 0-5% |

EXAMPLE 3

Walls can be clad with other elements than tiles. Instead of wall-paper or paint or distemper decoration, large sheets can be applied to make the wall surface sturdy. The following illustrates a suitable composition for thin sheets. Due to the requirements of good flow properties during the molding or calendering of the composition, pure matrix has been chosen but the mineral contents are higher than in the composition of example 1, and the quality requirements are not that critical as in this tile. Consequently, an inferior mineral constituent is used.

| | |
|---|---|
| Phenolic Resin | 6-10% |
| Cement Powder | 18-22% |
| Synopal 0-140 μm | 68-72% |
| Organic Pigments | 0-2% |

EXAMPLE 4

Wall elements of the above type can be constructed in different ways for different purposes. For a fairly heavy element to be mounted on an existing wall the following recipe is used. The matrix is the same as the matrix of example 3 but larger particles have been added in a substantial amount. The reason is that the flow properties are not critical, and the difference of impact strength between the two products can hardly be measured. This difference is, however, quite noticeable if large particles are added to the thin sheet composition of example 3, and for reasons of sturdiness the thin sheets manufactured on the basis of this formula do not involve the risk of inferior impact strength caused by large particles. In the heavy element (12–20 mm thickness) the addition of large particles of 2–4 mm does not influence these properties.

| Phenolic Resin | 3.5–4.0% |
|---|---|
| Synopal 0–140 μm | 33–35% |
| Synopal 0–500 μm | 18–22% |
| Synopal 500–1500 μm | 18–22% |
| Synopal 1500–2000 μm | 18–22% |
| Metal Oxides | 0–4% | or

| Polyester Powder | 5–8% |
|---|---|
| Synopal 0–140 μm | 30–36% |
| Synopal 0–500 μm | 16–18% |
| Sand 500–1500 μm | 16–18% |
| Granite Pebbles 2000–4000 μm | 22–24% |
| Metal Oxides | 0–4% |

EXAMPLE 5

This matrix can be applied to surfaces of existing elements, too. One example is the surface of a metal sheet, —steel, aluminum, copper etc. A preferred method is roller coating but lamination is also possible. In the case of roller coating the matrix is used without the addition of large particles due to the flow properties and the adhesion to the metal surface. Such coated sheets can be used for outer walls in building construction, for roofs and for several purposes where fire risks are fatal, e.g. in ships' bath-rooms, cabin walls, pantries etc. and for walls of lifts in tall buildings etc.

| Epoxy Resin | 20% |
|---|---|
| Copper Powder | 5% |
| Synopal 0–140 μm (Silane Coated) | 75% |
| Epoxy Resin | 18% |
| Synopal 0–140 μm (Silane Coated) | 74% |
| Metal Oxides) | 4% |
| Melamine Resin (On Top) | 4% |

EXAMPLE 6

In the case of lamination the compositions of examples 1 and 3 may be used but impact strength is not that important because the coating is supported by the metal sheet. Thus thin sheets of the following composition can be mounted and later applied to the metal surface by means of an adhesive.

| Phenolic Resin | 5–8% |
|---|---|
| Synopal 0–140 μm | 88–92% |
| Metal Oxides | 2–4% |

EXAMPLE 7

For critical applications where water is present, either as rain or at sea, a water repellent effect can be achieved by the following composition:

| Epoxy Resin | 18% |
|---|---|
| Silicone Resin | 2% |
| Copper Powder | 5% |
| Synopal 0–140 μm (Silane Coated) | 75% |

EXAMPLE 8

Other elements than metal sheets, —wooden chipboard, insulating board, asbestos/cement sheets etc. can be coated, too. In some cases the element has been manufactured in advance, and there the composition of example 6 could be used. However, it is often desirable to apply a heavy layer of the matrix, partly for strength reasons, partly for fire-proofness reasons. In that case it is advisable to use the following recipe because the matrix is richer than the others with respect to resin content, and consequently it will adhere to the surface of the element simultaneously with the molding. The matrix containing large particles is placed on top of the element (or in the cavity with the element on top), and the upper part of the compression tool moves down, molding and curing the matrix and pressing out the resin of the matrix into the surface of the element.

| For Chipboard: | |
|---|---|
| Phenolic Resin | 10–14% |
| Synopal 0–140 μm | 30–40% |
| Synopal 2000–4000 μm | 50–60% |
| Organic Pigments | 0–2% |
| Titanium Dioxide | 3% |
| For Asbestos/cement: | |
| Phenolic Resin | 10% |
| Silicone Resin | 2% |
| Synopal 0–140 μm | 84% |
| Metal Oxides | 4% |

EXAMPLE 9

A further development of this principle has been used for the next purpose: integral production of composite wall elements. Wooden chips or mineral fibres are placed in the mold after being mixed with pure matrix in a relevant ratio. On top or under this layer of chips or fibres, a composition as described in example 8 is placed. It is less rich with respect to resin content because the chips or fibres are already impregnated with the matrix. After compression molding the final products are almost identical to the products made before.

| Matrix for Chips: | |
|---|---|
| Melamine Resin | 6% |
| Epoxy Resin | 15% |
| Synopal 0–140 μm | 79% |
| Top Coat: | |
| Epoxy Resin | 8% |
| Silicone Resin | 1.5% |
| Synopal 0–140 μm | 86% |
| Metal Oxides | 4.5% |

EXAMPLE 10

Exceptionally high mechanical strength can be achieved through the addition of short glass fibres which are admixed with the composition in the last period of ball milling. These glass fibres must be very thin to ensure that the reinforcing effect is obtained. Such high mechanical strength is desirable in the case of roof tiles or outer wall elements without further support from existing elements. The addition of a silicone resin makes the tile water-repellent and improves its impact strength properties. The addition of a UV-stabilizer improves weathering properties.

| Phenolic Resin | 4% |
|---|---|
| Silicone Resin | 1% |
| UV - Stabilizer | 0.2% |
| Synopal 0-140 μm | 30% |
| Synopal 600-840 μm | 30% |
| Sand 800-1200 μm | 30% |
| Glass Fibres | 2% |
| Metal Oxides | 2.8% |

EXAMPLE 11

For decorative purposes, a printed sheet of thin paper impregnated with a melamine resin is placed on top of the matrix before molding. The two resin constituents cure simultaneously, and the top layer decoration is then an integral part of the moulded item. A suitable matrix for table top protection plus decoration is the following, where special attention has been paid to impact strength, surface hardness and gloss:

| Decorated Dry Formed Paper: | |
|---|---|
| Cellulose fibres 25% | |
| Synopal 0-140 μm 25% | |
| Melamine Resin 50% | 10% |
| Phenolic Resin | 10% |
| Synopal 0-140 μm | 78% |
| Metal Oxides | 2% |

EXAMPLE 12

For heavier thicknesses, e.g. in the case of serving trays, dining tablets and heat protection boards for domestic use, the following composition is used with the impregnated paper decoration. The matrix is the same as above but large particles have been added.

| Decorated Dry Formed Paper | |
|---|---|
| (as above) | 5% |
| Phenolic Resin | 5% |
| Synopal 0-140 μm | 40% |
| Synopal 200-600 μm | 48% |
| Organic Pigments | 2% |

EXAMPLE 13

For more complicated items, e.g. vases, ash trays and bowls, flow properties must be balanced to moulding conditions. An increase of the resin content, the choice of regular mineral particles in the matrix, the addition of Aerosil and a low content—if any—of large particles are natural precautions in such cases:

| Polyester Resin | 25% |
|---|---|
| Aerosil | 0.5% |
| Synopal 0-140 μm | 30% |
| China Clay | 20% |
| Sand 200-600 μm | 20% |
| Metal Oxides | 4.5% |

EXAMPLE 14

If such articles are to be used for technical purposes, e.g. electrical fuse elements, the resin must be able to withstand high working temperatures without being deteriorated, the mineral must be non-conductive and preferably sintered at high temperatures, and the impact strength must be high. The following compositions have proved to be successful:

| Phenolic Resin | 30% |
|---|---|
| Aerosil | 0.5% |
| Synopal 0-140 μm | 65% |
| Low molecular polyethylene | 2% |
| Metal Oxides | 2.5% |
| Epoxy Resin | 20% |
| Aerosil | 0.5% |
| Synopal 0-140 μm | 75% |
| Wax | 1% |
| Metal Oxides | 3.5% |

EXAMPLE 15

For special purposes it is desirable to form the final product in situ. An outer wall panel can be bent around a corner, roof tiles can be bent round the ridge or upwards to a wall etc. In such cases a semi-curable or even a fully thermoplastic resin shall be used. The forming in situ takes place by means of an electrical heater element or a torch gently applied.

| Acrylic Resin | 25% |
|---|---|
| Silicone Resin | 2% |
| Synopal 0-140 μm | 70% |
| Metal Oxides | 3% |

EXAMPLE 16

Usually, the matrix must be chemically cured to ensure constant mechanical properties at elevated temperatures. In some cases, however, where this feature is of no importance, productivity can be increased by means of a thermoplastic resin in the matrix. The composition shall be heated, and the moulding tool shall be cooled. The total moulding cycle will last 10 or 20 seconds according to thickness compared with thermosetting lasting 1 or 2 minutes. A typical composition is the following:

| Polystyrene Powder | 25% |
|---|---|
| Talc | 20% |
| Synopal 0-140 μm | 50% |
| Titanium Dioxide | 3% |
| Organic Pigments | 2% |

EXAMPLE 17

Fire proofness has been mentioned before. A porous mineral constituent can be ball milled with a mixture of chlorinated paraffin and antimony trioxide before the addition of the resin and other constituents to the matrix. The resulting matrix will be non-inflammable and impart non-inflammable properties to the final product, e.g. wooden chipboard:

| Mineral Constituent: | |
|---|---|
| Chlorinated Paraffin | 10% |
| Antimony Trioxide | 4% |
| Synopal 0-140 μm | 86% |
| | 88% |
| Polyester Resin | 10% |
| Metal Oxides | 2% |

EXAMPLE 18

A very interesting product can be obtained by using powdered nitrile rubber as resin in the matrix and silane-treated mineral to increase bonding strength in the interface. Thin and longlasting shoe soles can be produced in this way:

| | | |
|---|---|---|
| Powderized Nitrile Rubber | | 30% |
| Synopal 0-140 μm | | 50% |
| Talc | | 20% |

EXAMPLE 19

A matrix useful for coating roofs or roofing-felt is produced by mixing the following ingredients:

| | |
|---|---|
| 10% | Phenolic resin |
| 5-10% | Bitumen |
| 85-80% | Synopal 0-140 μm |

EXAMPLE 20

The following samples were produced having a low content of resin binder and containing different amounts of coarse mineral particles:

| Sample No. 1 | | | |
|---|---|---|---|
| Synopal | 0-140 μm | 34.2% | |
| | 0-500 μm | 20.0% | |
| | 500-1500 μm | 20.0% | |
| | 1500-2000 μm | 20.0% | |
| | | | 94.2% |
| Phenolic Resin | | | 3.8% |
| Metal Oxides | | | 2.0% |

This composition is useful only for heavy products.

| Sample No. 2 | | | |
|---|---|---|---|
| Synopal | 0-140 μm | 36% | |
| | 0-500 μm | 16% | |
| | 500-1500 μm | 20% | |
| | 1500-2000 μm | 22% | |
| | | | 94% |
| Phenolic Resin | | | 4% |
| Metal Oxides | | | 2% |

This composition is useful only for heavy products.

| Sample No. 3 | | | |
|---|---|---|---|
| Synopal | 0-140 μm | 36% | |
| | 600-840 μm | 60% | |
| | | | 96% |
| Phenolic Resin | | | 4% |

A specimen cast from this material had good strength.

| Sample No. 4 | | | |
|---|---|---|---|
| Synopal | 0-140 μm | 36% | |
| | 200-600 μm | 60% | |
| | | | 96% |
| Phenolic Resin | | | 4% |

The sample had high strength, and the composition is useful for both thin and heavy products.

| Sample No. 5 | | |
|---|---|---|
| Synopal | 0-140 μm | 96% |
| Phenolic Resin | | 4% |

This sample had poor strength due to the omission of great particles and a low content of binder.

EXAMPLE 21

A number of samples were produced having the following compositions:

| Sample No. 1 | | | |
|---|---|---|---|
| Synopal | 0-140 μm | 74% | |
| | 500-1500 μm | 20% | |
| | | | 94% |
| Phenolic Resin | | | 6% |
| Sample No. 2 | | | |
| Synopal | 0-140 μm | 85% | |
| Epoxy Resin | | 14% | |
| Metal Oxides | | 1% | |
| Sample No. 3 | | | |
| Synopal | 0-140 μm | 87% | |
| Phenolic Resin | | 10% | |
| Metal Oxides | | 1% | |
| Cellulose fibre | | 2% | |

This sample has an improved impact strength and is more flexible on account of the fiber content. It is useful for making imbossable top layers.

| Sample No. 4 | | |
|---|---|---|
| Synopal 0-140 μm | 35% | |
| 200-600 μm | 59% | |
| | | 94% |
| Phenolic Resin | 4% | |
| Metal Oxides | 2% | |
| Sample No. 5 | | |
| Synopal 0-140 μm | 85% | |
| Phenolic Resin | 10% | |
| Metal Oxides | 5% | |
| Sample No. 6 | | |
| Synopal 0-140 μm | 86% | |
| Phenolic Resin | 10% | |
| Metal Oxides | 4% | |
| Hot pressed into plates reinforced by metal bars in one direction | | |
| Sample No. 7 | | |
| Synopal 0-140 μm | 86% | |
| Phenolic Resin | 10% | |
| Metal Oxides | 4% | |
| Hot pressed into plates reinforced by a metal screen. | | |

The samples Nos. 6 and 7 are useful as roofing plates, which on account of the imbedded reinforcement may be made thinner and lighter than conventional roofing plates. The plates are also less water absorbent than conventional plates.

| Sample No. 8 | |
|---|---|
| Synopal 0-140 μm | 90% |
| Phenolic Resin 10% | |
| Hot pressed into plates reinforced by an Al-plate of 0.5 mm on one side of the product. | |
| Sample No. 9 | |
| Synopal 0-140 μm | 90% |

| Phenolic Resin | 10% |
|---|---|
| Hot pressed into plates reinforced by an Al-plate of 2 mm on one side of the product. | |
| Sample No. 10 | |
| Synopal 0-140 μm | 90% |
| Phenolic Resin | 10% |
| Hot pressed into plates decorated by a 0.05 mm Cu-foil on one side of the product. | |

The samples No. 8, 9 and 10 are useful as roofing plates and outer wall tiles, plates and panels, as they have a metal appearance and provide excellent protection against UV radiation.

| Sample No. 11 | |
|---|---|
| Synopal 0-140 μm | 94% |
| Phenolic Resin | 6% |
| on top of (4:1) | |
| Urea formaldehyde | 20% |
| Newspaper Waste | 80% |

This sample when hot pressed into a relatively thin flexible material, is useful as a decorative wall lining, which on account of the paper backing can be pasted up like wallpaper.

The following samples Nos. 12–18 have been prepared as decorative tiles for wall lining. Paper or textile of the stated nature, decorated for example by dyeing or imprinting, is laid on top of the matrix, and the material is hot pressed into tiles of desired size and thickness. During the pressing operation the surface of the tiles may be embossed with a desired pattern.

| Sample No. 12 | |
|---|---|
| Decorated wet layed tissue 17 g/m² | |
| Powdered with 10 g/m² Melamin Resin | |
| on top of | |
| Synopal 0-140 μm | 90% |
| Phenolic Resin | 10% |
| Sample No. 13 | |
| Decorated wet layed tissue 30 g/m² | |
| on top of | |
| Synopal 0-140 μm | 90% |
| Phenolic Resin | 10% |
| Sample No. 14 | |
| Decorated wet layed paper saturated in a Melamin Solution of water, dryed and placed on top of | |
| Synopal 0-140 μm | 85% |
| Epoxy Resin | 15% |
| Sample No. 15 | |
| Decorated Woven Cotton powdered with 5 g/m² Melamin Resin, on top of | |
| Synopal 0-140 μm | 89% |
| Phenolic Resin | 10% |
| Metal Oxides | 1% |
| Sample No. 16 | |
| Decorated Dry Formed Paper 100 g/m² | |
| Cellulose fibre | 20% |
| Synopal 0-140 μm | 20% |
| Melamin Resin | 60% |
| on top of | |
| Synopal 0-140 μm | 90% |
| Phenolic Resin | 10% |

The use of the special dry formed paper with a high melamine resin content and a high Synopal content brings about the particular advantages of a glossy and wear-resisting surface.

| Sample No. 17 | |
|---|---|
| Decorated wet laid tissue on top of | 17 g/m² |
| Synopal 0-140 μm | 85% |
| Polyester Resin | 15% |
| Sample No. 18 | |
| Decorated dry formed paper on top of | |
| Synopal 0-140 μm | 85% |
| Epoxy Resin | 15% |
| Sample No. 19 | |
| Synopal 0-140 μm | 88% |
| Phenolic Resin | 10% |
| Metal Oxides | 2% |

This sample is useful as undecorated, but embossed tiles or as a top layer on a matrix containing coarse mineral particles.

| Sample No. 20 | |
|---|---|
| Synopal 0-140 μm | 90% |
| Phenolic Resin | 7% |
| Metal Oxides | 2% |
| Silicone Resin | 1% |
| Sample No. 21 | |
| Synopal 0-140 μm | 89% |
| Phenolic Resin | 9% |
| Organic Pigments | 2% |
| Sample No. 22 | |
| Synopal 0-140 μm | 93% |
| Phenolic Resin 5% | |
| Metal Oxides | 2% |
| Oiled on the surface | |

This sample is useful as floor tiles pre-treated with oil and thereby easy to maintain.

| Sample No. 23 | |
|---|---|
| Synopal 0-140 μm | 87% |
| Phenolic Resin | 10% |
| Metal Oxides | 3% |
| Melamine Resin Cu-particles on the surface | |

The following samples Nos. 24–28 are useful as press moulded electrical insulation items such as electrical switches and fuse bodies.

| Sample No. 24 | |
|---|---|
| Synopal 0-140 μm | 80% |
| Epoxy Resin | 20% |
| Sample No. 25 | |
| Synopal 0-140 μm | 70% |
| Epoxy Resin | 30% |
| Sample No. 26 | |
| Synopal 0-140 μm | 80% |
| Phenolic Resin | 20% |
| Sample No. 27 | |
| Synopal 0-140 μm | 85% |
| Phenolic Resin | 15% |
| Sample No. 28 | |
| Synopal 0-140 μm | 90% |
| Acrylic Resin | 10% |
| Sample No. 29 | |
| Synopal 0-140 μm | 90% |
| Phenolic Resin | 9% |
| Metal Oxides heterogeneous distributed to obtain a | |

| Sample No. 30 | |
|---|---|
| special effect | 1% |
| Coating of steel | |
| Synopal 0–140 μm | 89% |
| Epoxy Resin | 10% |
| Acrylic Resin & Color | 1% |
| A special effect is achieved because the mixture is both thermosetting and thermoplastic | |
| Sample No. 31 | |
| Coating of steel | |
| Synopal 0–140 μm | 73% |
| Epoxy Resin | 20% |
| Cu-powder | 5% |
| Silicone Resin | 2% |

This sample is useful for coating ships panels, becuase the high content of epoxy resin makes the coating impact resistant and tough, the copper powder controls fowling, and the silicone resin makes the surface hydrophobic.

| Sample No. 32 | |
|---|---|
| Coating of steel | |
| Synopal 0–140 μm | 76% |
| Epoxy Resin | 20% |
| Cu-powder | 2% |
| Silicone Resin | 2% |
| Sample No. 33 | |
| Coating of steel | |
| Synopal 0–140 μm | 78% |
| Epoxy Resin 20% | |
| Silicone Resin | 2% |
| Sample No. 34 | |
| Synopal 0–140 μm | 63% |
| Wooden Chips | 20% |
| Melamine Resin | 5% |
| Epoxy Resin 12% | |
| Hot pressed into plates having basic weight | 17 g/m² |
| Specific gravity | 1.42 g/cm³ |

This sample is a fire-proof chipboard useful for outdoor applications.

| Sample No. 35 | |
|---|---|
| Synopal 0–140 μm | 80% |
| Wooden Chips | 15% |
| Phenolic Resin | 5% |
| Sample No. 36 | |
| Synopal 0–140 μm | 43% |
| Wooden Chips | 46% |
| Urea formaldehyde Resin | 11% |
| Sample No. 37 | |
| Wooden Chipboard coated with a thin layer of | |
| Synopal 0–140 μm | 85% |
| Acrylic Resin | 15% |

The board is more fire-proof than a chipboard without coating and on account of the decoration or embossing of the top layer the board can be used as a finished visible building element.

| Sample No. 38 | |
|---|---|
| Coated Wooden Chipboard | |
| Synopal 0–140 μm | 70% |
| Epoxy Resin | 20% |
| Nylon Resin | 10% |

The board has a more flexible surface and the nylon resin is much cheaper than the epoxy resin.

| Sample No. 39 | |
|---|---|
| Coated Wooden Chipboard | |
| Synopal 0–140 μm | 50% |
| Melamine Resin | 30% |
| Decorated non woven rayon textile | 20% |

The board has a glossy decorated surface.

| Sample No. 40 | |
|---|---|
| Coated Wooden Chipboard | |
| Synopal 0–140 μm | 83% |
| Acrylic Resin | 12% |
| Decorated non woven rayon textile | 5% |
| Sample No. 41 | |
| Coated Wooden Chipboard | |
| Synopal 0–140 μm | 85% |
| Polyester Resin | 15% |
| reinforced with a brass woven material. | |
| Sample No. 42 | |
| Coated Asbestos Cement (Eternit) | |
| Synopal 0–140 μm | 87% |
| Phenolic Resin | 9% |
| Metal Oxides | 3% |
| Silicone Resin | 1% |

EXAMPLE 22

A mixture of 90 parts by weight of Synopal and 10 parts by weight of phenolic resin is ground in a ball mill to a particle size of from 0 to 150 μm. This matrix is mixed with equal parts by weight of Synopal with a particle size of from 250 to 1500 μm. The mixture is used as a molding composition for manufacturing roofing sheets. The sheets are pressed in a die or mold and, heated to 210° C., for 20 seconds. For final curing the sheets are heated with direct flames in an oven for 2 minutes. This treatment will complete the curing of the resin and burn the evolved volatile gasses, especially formaldehyde.

EXAMPLE 23

Cement clinkers produced in conventional manner by heating in a clinker kiln and cooling in a water bath are re-heated to 1200° C. in a rotary kiln for two hours and then slowly cooled to room temperature. These clinkers proved to have a higher degree of crystallization than normally. The clinkers are ground in a ball mill with steel balls for 10 minutes, after which there is added 6% by weight of phenolic resin, and grinding is continued for a further 5 minutes. The grain size of the ground product is 0–300 μm. The product is pressed into 6 mm thick panels by heating to 170° C. for 30 seconds.

EXAMPLE 24

50% Synopal is mixed with 50% portland cement. The grain size of Synopal was from 0–600 μm and that of the cement 0–50 μm. The mixing was effected in a ball mill with ceramic balls for one hour, and 1% phenolic resin was added halfway through the grinding period. The product was then caused to pelletize and sinter in a rotary kiln at about 1400° C., after which it was cooled to room temperature and subjected to reheating at 1100° C. for two hours. This resulted in a spherical material ranging in size from about 2–3 mm to 1 cm. The product was crushed to a size from 0-2 mm and ground in a ball mill for two hours, after which 6% phenolic resin was added. The material was shaped in a press into 6 mm panels of good strength with a density of about 2. The panels are suitable as roof slabs.

EXAMPLE 25

Example 23 was repeated with the modification that in addition to 1% phenol there was added 1% bitumen during the first phase. This product was of more bubbly nature and of less density than the former product, the density of the finished panel being 1.85 owing to the greater number of bubbles.

EXAMPLE 26

Example 23 was repeated, but instead of 50% Synopal there was used 75% Synopal and 25% cement. Otherwise the same experiments were made with adding 1% phenol and 1% bitumen. This product was pressed into panels, which were stronger than those obtained according to Examples 2 and 3 and suitable for roof slabs and wall facing.

EXAMPLE 27

25% Synopal and 75% cement were used. This experiment resulted in a material of very dark appearance which was unsuitable for dyeing with other colors, but the product, when immersed in water, showed a white deposit with a discolored surface, presumably deriving from alkali salts, being otherwise of excellent quality with good processability by means of tools.

EXAMPLE 28

The experiments of Examples 24 to 27 were repeated, but without adding any phenol and bitumen to the ball mill before sintering. These experiments resulted in a very heavy material with a density in excess of 2. This product proved excellent for surface layers in laminates. One experiments used 70% of such powders, ground to a grain size of from 0-100 $\mu$m, and the addition of 30% phenolic resin.

EXAMPLE 29

In a further experiment phenol was replaced by 30% melamine. The surface in this case was very strong and weather resistant, and the product was suitable as exterior wall surfaces exposed to great mechanical and climatic loads.

EXAMPLE 30

The experiment of Example 24 is repeated, but instead of mixing ready-made Synopal with ready-made cement, clinkers of the following composition are made:

| | |
|---|---|
| $SiO_2$ | 45% |
| $Al_2O_3$ | 4% |
| $Fe_2O_3$ | 2% |
| CaO | 45% |
| MgO | 2% |
| Gypsum | 1% |
| $Na_2O + K_2O$ | 1% |

The product obtained proved to be practically free from cristobalite and unbonded quartz. The product was processed as indicated in Example 2 into panels of good strength characteristics.

EXAMPLE 31

In a ball mill was obtained a product from blast furnace aggregate (TARMAC ®). Blast furnace aggregate was ground in a ball mill with ceramic balls for an hour from 0-2 mm down to 0-600 $\mu$m, after which (% phenolic resin was added, and grinding was continued for one hour, whereby the grain size of blast furnace aggregate was reduced to 0-400 $\mu$m. This product was pressed into panels, which were suitable for roofing and facing.

EXAMPLE 32

In one experiment the procedure of Example 31 was repeated, however with the addition of only 2½% phenol to the product, which was used for a panel, and this panel was laminated with a ~400 g/m² thick layer of 30% phenolic resin and 70% 0-100 Synopal. This resulted in a material which could be dyed in various colours, had great strength and was cheaper in terms of composition of raw materials than the so-called ETERNIT ®.

EXAMPLE 33

A subsequent experiment used 50% Synopal with a grain size of from 0-2 mm, which was ground for two hours in a ball mill kiln with ceramic balls to a grain size of 0-1 mm, after which blast furnace aggregate 0-2 mm was added, and the aggregate product was ground until obtaining a grain size of from 0-300 $\mu$m. 6% phenolic resin was then added, and some excellent panels were obtained from this product.

EXAMPLE 34

The process of Example 33 was repeated, however, with the distinction that only 3% phenolic resin was added to the product, but this was again laminated with a surface on either side, consisting of 20% phenol and 80% of the mixture of 50% Synopal and 50% blast furnace aggregate. Total content: 4.5% phenol.

EXAMPLE 35

A subsequent experiment used exclusively Synopal and melamine for the surface coating, i.e. 20% melamine and 80% Synopal. This resulted in a product suitable for decoration and dyeing.

EXAMPLE 36

In one experiment was used ⅔ of blast furnace aggregate which was ball-milled from 0.2 down to 0-800 $\mu$m. Re-heated cement clinkers plus 2% gypsum were then added. The cement clinkers had been crushed to 0-2 mm in advance. The aggregate product was ground in a ball mill with ceramic balls to a grain size of from 0-200 $\mu$m, and this resulted in an excellent product after adding during the latter part of the grinding process 8% phenolic resin, which product was suitable for roof slabs and wall panels, for outdoor as well as indoor purposes.

EXAMPLE 37

The experiment of Example 36 was repeated, using, however, only 2% phenolic resin in the product, the resin being added before completion of the ball milling process. There was applied a surface of the same product, but with 20% phenol in the surface. The aggregate product has a phenolic resin content of about 4%. The product is less expensive then Eternit and gave a non-flammable product easy to process.

EXAMPLE 38

Clinkers were produced in the manner indicated in Example 30, however, with the modification that also dolomite was added in an amount to produce the following composition of the finished clinkers:

| | |
|---|---|
| $SiO_2$ | 45% |
| $Al_2O_3$ | 4% |
| $Fe_2O_3$ | 2% |
| CaO | 40% |
| MgO | 7% |
| Gypsum | 1% |
| $Na_2O + K_2O$ | 1% |

The product was crushed and processed into panels by means of the method of Example 24.

EXAMPLE 39

Cement clinkers and 10% water, based on the weight of the clinkers are ground in a ball mill to a particle size of 0-400 μm. During the last stage of grinding dry air is passed through the ball mill to obtain a dry powder. Then 6% phenolic resin is added, and grinding is continued for a further 5 minutes. The product is pressed into 6 mm thick panels by heating to 170° C. for 30 seconds.

EXAMPLE 40

Cement powder is mixed with water in the ratio 1:2 by weight and allowed to set. The product is mixed in a ball mill with 6% phenolic resin and pressed into panels as described in Example 39. The panels have excellent fire resistant properties.

EXAMPLE 41

The experiment of example 23 is repeated, but a mixture of 50% cement clinkers and 50% Synopal is substituted for the cement clinkers. The panels produced have excellent fire resistant properties.

What I claim is:

1. A material for use in the molding or pressing of articles which comprises in admixture a crystallizable glass which is made in a rotary kiln and comprises numerous bubbles and is ground in such a manner that numerous cavities are formed on the surfaces of the particles by cleavage of the bubbles and comprises fractions of relatively fine-grained material having a particle size of up to 250 μm and fractions of coarser particles having a particle size of from 250 to 5000 μm, wherein the particles of the relatively fine-grained material have been subjected to an intimate mixing treatment in the presence of an organic binder thereby to essentially distribute the binder in the form of a coating on the rough surface of the particles of the relatively fine-grained material, and wherein said coated particles are distributed among the coarser particles.

2. A molding material according to claim 1, wherein the mixing treatment is a ball mill grinding.

3. A molding material according to claim 1, wherein the organic binder is a thermosetting resin.

4. A molding material according to claim 3, wherein the binder is selected from the group consisting of phenol formaldehyde resins, epoxy resins, melamine resins, urea formaldehyde resins and urethane resins.

5. A molding material according to claim 1, wherein the material further contains fibres of mineral, vegetable or synthetic origin.

6. A molding material according to claim 1, wherein the content of coarser particles amounts to 25 to 75% by weight of the total mixture.

7. Molded article prepared by subjecting the material according to claim 1 to a molding or pressing in a mold thereby to cause the binder to cure and form with the finer particles a matrix binding together the coarser particles.

8. Process for the preparation of a material for use in the molding or pressing of articles which comprises
    (a) grinding a crystallizable glass material which is made in a rotary kiln and comprises numerous bubbles to particles having numerous cavities on its surface by cleavage of the bubbles and comprising fractions of relatively fine-grained material having a particle size of up to 250 μm, and fractions of coarser particles having a particle size of from 250 to 5000 μm
    (b) subjecting a predetermined amount of said fractions of fine-grained material particles and an organic binder to an intimate mixing treatment thereby to essentially distribute the binder in the form of a coating on the rough surface of the particles, and
    (c) admixing a predetermined amount of said coarser particles with said coated finer particles thereby to distribute the finer particles among the coarser particles and form a moldable material.

* * * * *